March 18, 1952 C. L. LONGMIRE ET AL 2,589,833

PULSE DISCRIMINATOR CIRCUIT

Filed May 3, 1945

INVENTORS
CONRAD L. LONGMIRE
ISRAEL H. SUDMAN
BY
William D. Hall,
ATTORNEY

Patented Mar. 18, 1952

2,589,833

UNITED STATES PATENT OFFICE 2,589,833

PULSE DISCRIMINATOR CIRCUIT

Conrad L. Longmire, Boston, and Israel H. Sudman, Cambridge, Mass., assignors, by mesne assignments, to the United States of America as represented by the Secretary of War Application May 3, 1945, Serial No. 591,746

5 Claims. (Cl. 250—27)

This invention relates in general to discriminator circuits and more particularly to pulse width discriminators.

In certain applications of radio circuits it is desirable to provide apparatus which will accept and pass voltage pulses of a certain type and reject all others. The basis of selection may be pulse amplitude, pulse sequence, or pulse width, to cite representative examples. These broad classifications of selective circuits may be further broken down into subclassifications. For instance, pulse width discriminators may pass only pulses of a certain duration or pulses longer than a critical value. It is the latter type of discriminator to which the circuit of the present invention belongs.

Accordingly, it is one object of the invention to provide means for distinguishing between pulses according to their duration.

Another object is to provide an indication of the receipt of a pulse signal of a predetermined nature.

Previously, discriminators passing pulses of a minimum duration or greater consisted of two stages, the first being a sawtooth generator having an output proportional in amplitude to the duration of the applied pulse, and the second being a biased amplifier which would respond when the sawtooth voltage reached a predetermined value.

In the present invention a modified multivibrator circuit is used, its action being somewhat similar to but improved over the type of circuit described in the preceding paragraph. The operation of the invention will be best understood with reference to the following specification, claims, and drawings, in which:

Figure 1:
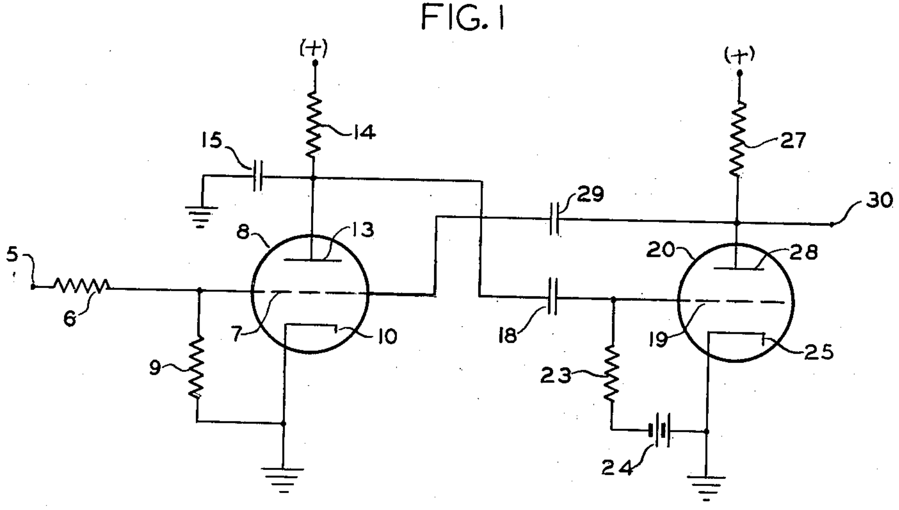
Fig. 1 is a schematic diagram of one embodiment of the invention.

Referring now to Fig. 1, terminal 5 has impressed on it video pulses, generally negative in polarity, from a suitable radio receiving system. These pulses are applied through resistor 6 to control grid 7 of vacuum tube 8. Resistor 9 is provided as a grid return resistor. Vacuum tube 8 is normally conductive, but if the negative pulses applied to grid 7 are of sufficient amplitude grid 7 will be driven so far negative with respect to cathode 10 as to cut off current flow through the tube. When tube 8 is cut off, anode 13, which is connected through load resistor 14 to a suitable positive biasing source, tends to assume the full potential of said biasing source. It is prevented from doing so immediately, however, by capacitor 15 which is connected from anode 13 to ground. Capacitor 15, no longer shunted by the relatively low resistance of a conducting vacuum tube, begins to charge through resistor 14. Therefore the rate of rise of potential on anode 13 is governed by the time constant of the resistance-capacitance circuit including resistor 14 and capacitor 15.

The potential on anode 13, which will increase during the time of application of a negative pulse to grid 7, is transferred through coupling capacitor 18 to grid 19 of vacuum tube 20. Grid 19 is also connected through resistor 23 to a negative biasing supply 24 which holds grid 19 below cutoff potential with respect to cathode 25. The rising voltage on anode 13 of vacuum tube 8 tends to overcome this negative bias.

If the input video signal is below the critical duration, the pulse voltage on grid 19 will not be sufficient to counteract the bias thereon before grid 7 of tube 8 is raised above cutoff and capacitor 15 discharges through tube 8. However, if the input video signal is above the critical duration, there will be a point where grid 19 is raised above cutoff and tube 20 starts to conduct. When this occurs current will flow through load resistor 27 causing anode 28 to drop abruptly in potential. This potential change is fed back to grid 7 of tube 8 through coupling capacitor 29, as in a normal multivibrator circuit, tending to hold grid 7 below cutoff even if the input signal should now be removed. Capacitor 29 discharges through resistor 9 and tube 20. When it has discharged sufficiently, and when the negative signal is removed from grid 7, tube 8 will again be conductive and tube 20 non-conductive. The circuit is now ready for application of another pulse.

By connecting terminal 30 to anode 28 the voltage variations thereon may be used as is convenient for indication of the presence of a signal of the desired type on terminal 5.

Figure 2:
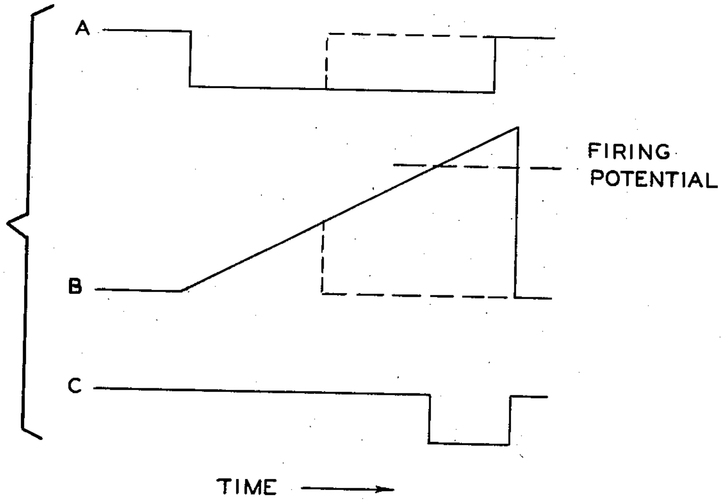
Fig. 2 is a representation of voltage waveforms in the circuit plotted with respect to time.

The curves of Fig. 2 illustrate the potential changes which have been discussed hereinabove. Curve A represents two video input signals, one long pulse indicated by solid lines and one short pulse indicated by dotted lines. The critical pulse duration lies between the two examples. Curve B shows the variations in potential at grid 19, in Fig. 1. Curve C shows the potential at anode 28. It can be seen that when curve B reaches the critical potential, tube 20 will conduct, dropping its plate voltage abruptly.

It is to be emphasized that what has been described hereinbefore is a preferred embodiment of the present invention, and certain changes and modifications may be made therein without exercise of inventive ingenuity. Hence all such changes and modifications are claimed as may fall fairly within the spirit and scope of the hereinafter appended claims.

What is claimed is:

1. In a pulse width discriminator circuit, a first thermionic vacuum tube having an anode, a cathode, and at least one control electrode, load means associated with said anode, a capacitor connected from the juncture of said load means and said anode to a point of reference potential, means for impressing signals onto the control electrode-cathode circuit of said tube whereby said first thermionic vacuum tube is rendered nonconductive for a period of time corresponding to the duration of said applied signals and whereby said capacitor is allowed to charge through said load means; a second thermionic vacuum tube having an anode, a cathode, and at least one control electrode, load means associated with said anode, means for biasing said second named control electrode negatively with respect to said cathode, coupling means between said anode of said second thermionic vacuum tube and said control electrode of said first thermionic vacuum tube, and coupling means between said anode of said first vacuum tube and said control electrode of said second vacuum tube, whereby voltage variations appearing on said first anode are impressed on said control electrode in such a manner as to overcome the bias applied to said control electrode.

2. An electronic pulse selector circuit comprising means for accepting input pulses having differing intervals of time duration, integration means for producing potentials which vary substantially linearly in amplitude from an initial value with the time duration of each of said pulses, an normally blocked pulse forming means energized by said potentials when they exceed said initial value by a predetermined amount, a regenerative circuit coupling said pulse forming circuit to said integrating means, and means in said regenerative circuit for prolonging the operation of said integrating circuit for a given interval after each of said first input pulses has ceased.

3. An electronic pulse selector circuit comprising a first vacuum tube having an anode, cathode and at least one control grid, a resistor connected from the said anode to a source of positive potential, a capacitor connected in a circuit from the said anode to the said cathode, said cathode being connected to a source of reference potential, a resistor connected from said control electrode to said cathode, means for impressing input pulses upon the control grid of the said vacuum tube whereby said tube will be rendered nonconductive for a period of time corresponding to the duration of said pulses and whereby said capacitor will charge in a substantially linear manner through said anode resistor, a second vacuum tube having an anode, cathode and at least one control grid, a resistor connected from the anode of the second vacuum tube to a source of positive potential, means for connecting said second-named cathode to a source of reference potential, coupling means between said anode of said first vacuum tube and control grid of said second vacuum tube to impress the voltage variations of said first anode upon said second control electrode, means for biasing said second-named control electrode negatively with respect to said second-named cathode so as to delay for a predetermined interval of time the conduction of said second-named vacuum tube until said charging capacitor has overcome said bias, capacitive means for connecting said second anode to said first control electrode, said capacitive means serving to prolong beyond the duration of said input pulse the time interval during which said first vacuum tube is cut off, the time prolongation interval being determined by the rate of discharge of said capacitive coupling through said first grid resistor.

4. A selective regenerative feed-back circuit comprising a pulse integrating circuit for developing saw-tooth potentials, an electron tube pulse forming means activated by said potentials, means biasing said pulse forming means to cut off to such degree that said cut off bias will be overcome by said potentials only after they have reached a predetermined amplitude, and a regenerative circuit coupling said pulse forming circuit to said integrating circuit so as to prolong the period of operation of said integrating circuit.

5. A selective regenerative feed-back circuit comprising a vacuum tube having anode, cathode and at least one control electrode, a resistor connected from said anode to a source of positive potential, means for connecting said cathode to a source of reference potential, means for producing a saw-tooth potential upon reception of a pulse of electrical energy, means for impressing said saw-tooth potential upon said control grid, means for biasing control grid negatively with respect to said cathode so as to delay conduction of said tube until said saw-tooth potential has been applied for a predetermined interval of time, a capacitor connected at one end to said anode and at the other end to said saw-tooth production means, and a resistor connected from said other end of said capacitor to said reference potential, said capacitor and last-named resistor serving to increase the time duration during which said saw-tooth potential is applied to said control grid beyond the duration of said input pulse to said saw-tooth generator.

CONRAD L. LONGMIRE.
ISRAEL H. SUDMAN.

REFERENCES CITED

The following references are of record in the file of this patent:

UNITED STATES PATENTS

| Number | Name | Date |
|---|---|---|
| 2,113,011 | White | Apr. 5, 1938 |
| 2,241,619 | Sherman | May 31, 1941 |
| 2,248,975 | Faudell | July 15, 1941 |
| 2,281,934 | Geiger | May 5, 1942 |
| 2,359,447 | Seeley | Oct. 3, 1944 |
| 2,363,659 | Doba, Jr. | Nov. 28, 1944 |
| 2,363,810 | Schrader et al. | Nov. 28, 1944 |